Feb. 23, 1965   G. C. TRIPLETT   3,170,206
CABLE ASSEMBLY
Filed March 22, 1963
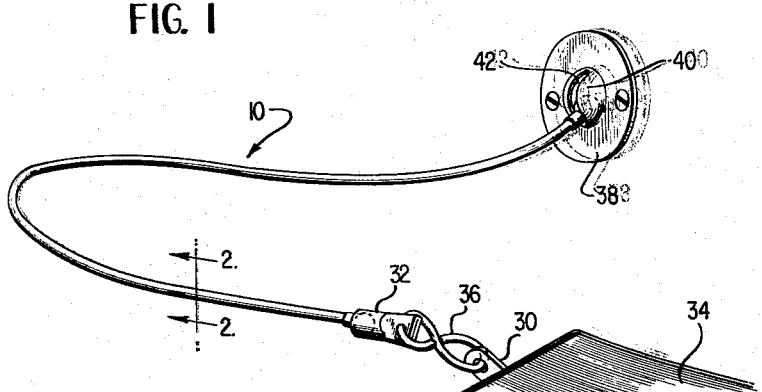
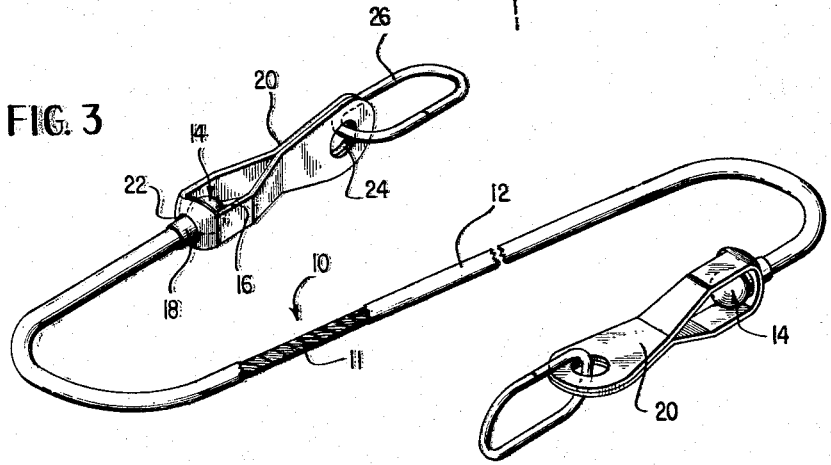
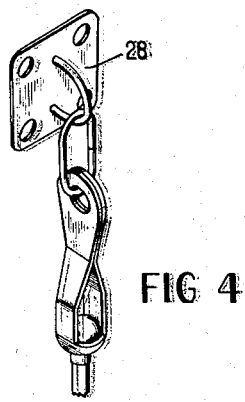
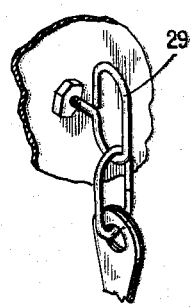
INVENTOR.
GEORGE C. TRIPLETT
BY
*Browne, Schuyler, & Beveridge*
ATTORNEYS.

3,170,206
CABLE ASSEMBLY
George C. Triplett, Atlanta, Ga., assignor to Gladwin Plastics, Inc., Atlanta, Ga., a corporation of Georgia
Filed Mar. 22, 1963, Ser. No. 267,401
4 Claims. (Cl. 24—73)

This invention relates to cable assemblies, and more particularly to flexible cable assemblies for connecting movable articles, such as telephone directories, with respect to fixed members, such as walls of public telephone booths.

While various forms of devices for retaining telephone directories in public telephone installations have been in use for many years, substantially all of the presently available devices suffer from one drawback or another either from the standpoint of expense or from the standpoint of giving satisfactory service. Of the various general types of securing devices now in use, the simple chain has been widely used because of its low cost and relative ease of installation. However, chains presently in use are not completely satisfactory because of their tendency to become kinked or tangled. Further, especially after kinking, the chains tend to scratch portions of the installation with which they come in contact. In the usual case, to minimize the scratching, the length of the chain is selected to be as short as possible consistent with convenient use of the directory, but because of the fact that the chains inherently become shorter during their life due to kinking, the shortening of the chain soon makes it difficult to use the directory conveniently.

Accordingly, it is an object of the present invention to provide a cable assembly which is economically competitive with chain assemblies of the type discussed above and in which the disadvantages of kinking and scratching are eliminated.

In the achievement of the foregoing, and other objects, a cable assembly embodying the present invention is constructed with a multistrand wire cable which is encased within a sheath of flexible plastic covering material. At each end of the cable, a ball element is fixedly secured to the cable to retain a mounting swivel or fastening element upon the cable. Other objects and features of the invention will become apparent by reference to the following specification and to the drawings.

In the drawings:

FIG. 1 is a perspective view showing one form of cable assembly embodying the invention;

FIG. 2 is a cross-sectional view of the cable of FIG. 1 taken on line 2—2 of FIG. 1;

FIG. 3 is a perspective view with certain parts broken away of a modified form of cable assembly;

FIG. 4 is a partial perspective view of one exemplary means for securing the cable of FIG. 3 to a fixed support; and FIG. 5 is a partial perspective view of another means for securing the cable of FIG. 3 to a fixed support.

Referring first to FIG. 3, an exemplary cable assembly embodying the invention includes a cable designated generally 10 having a core 11 which is preferably in the form of a multistrand wire cable of a type which combines both sufficient strength and flexibility for the intended use. Cable core 11 is encased within a sheath or coating 12 of a suitable flexible plastic material. Preferably, the sheath 12 is applied by a coating process so that the coating is bonded to the cable core. The coating does not impart any substantial strength to the cable assembly, but is applied for the dual purpose of preventing the cable from scratching objects with which it may come into contact and also to provide resistance to kinking. While the materials of cable core 11 and coating 12 may be selected from any of many suitable materials, an assembly in which cable core 11 is formed from stainless steel stranded wire rope and sheath 12 takes the form of a nylon coating has been found to be very satisfactory.

At each end of cable 10, a ball element designated generally 14 is fixedly secured to the cable. Each ball element includes an enlarged diameter spherical head 16 and a reduced diameter neck 18 which is integral with the generally spherical head 16. Ball element 14 is secured to the cable by clamping its neck 18 onto the end of the cable, neck 18 being of hollow tubular construction and, as best seen in FIG. 3, fitting onto the cable externally of coating 12.

In the FIG. 3 embodiment, like swivel members 20 are retained on each end of cable 10 by the respective ball elements 14. Each swivel member 20 is formed with an opening 22 having a diameter greater than the diameter of ball element neck 18 and less than the diameter of ball head portion 16. The loose fit between neck 18 and opening 22 allows a free swiveling action between the cable and swivel element 20. To provide complete freedom of movement, as well as to provide a convenient means of assembly, each swivel element 20 is constructed with a relatively large second opening 24 which loosely receives a ring member 26 employed to attach the associated swivel to a securing means such as hinge hasp 28 (FIG. 4) or screw eye 29 (FIG. 5) or to the directory mounting element 30 (FIG. 1).

In the FIG. 1 embodiment, a slightly modified form of swivel 32 is employed to secure the cable assembly to a telephone directory or similar article indicated partially at 34 in FIG. 1. In the FIG. 1 embodiment, an S hook 36 is mounted upon swivel member 32 for limited swiveling movement, while the opposite end of the S hook is received within a bracket 30 secured to the telephone directory. The right angle relationship between the respective axes of movement at either end of S hook 36 combined with the swiveling action of the ball element on the cable provides substantially complete freedom of movement.

In FIG. 1, a wall mounting element in the form of a plate-like member 38 is employed to secure the assembly to a fixed support, not shown. The outer peripheral portions of plate member 38 are flat while its central portion is upset into the form of a hemispherical projection 40 through which is cut a diametrically extending slot 42 having a width greater than the diameter of ball element neck 18 and less than the diameter of ball head element 16. The diameter of hemispherical projection 40 is substantially greater than the diameter of ball head 16 so that the ball can move longitudinally of slot 42 when plate member 38 is fixedly secured to a flat surface. Plate member 38 is mounted upon the cable by first projecting the cable end through slot 42 and subsequently securing the ball element on that cable end.

The cable assemblies described above each provide an economical assembly which combines the desired characteristics of flexibility and resistance to kinking. The continuous smooth external surface of the assembly does not tend to scratch other elements of the installation and does not become caught or entangled with other objects as chains tend to do. Further, the continuous cable is much more resistant to kinking than are chains since it is difficult to get the cable into a configuration where it will become entangled with itself.

While various embodiments of the invention have been disclosed, it will be apparent to those skilled in the art that the disclosed embodiments may be modified. Therefore, the foregoing description is to be considered exemplary rather than limiting, and the true scope of the invention is that defined in the following claims.

I claim:
1. A flexible cable assembly for connecting an article, such as a telephone directory, with respect to a fixed member, such as a wall of a telephone booth, said assembly comprising a cable having a flexible core, a sheath of flexible coating material encasing and engaging said core along the full length of the core, first securing means adapted to be secured to said fixed member and having an opening therein loosely receiving one end of said coated core to permit relative movement between said cable and said first securing means, second securing means including a swivel adapted to be secured to said article, said second securing means having a circular opening therein loosely receiving the opposite end of said coated core, and a ball element fixedly mounted upon each end of said coated core in gripping engagement with said sheath and being engageable respectively with portions of said first and second securing means defining said openings for preventing withdrawal of the respective ends of said coated core from said first and second securing means, said circular opening being sufficiently larger than the end portion of the cable received therein so as to permit relative universal movement between the cable and said second securing means.

2. A cable assembly as defined in claim 1 wherein said first securing means comprises a plate-like member adapted to be mounted upon said fixed member, said plate-like member including an upset hemispherical projection having a diameter greater than the diameter of said ball element, and an elongate slot extending diametrically across said projection, said slot having a uniform width dimensioned greater than the diameter of the neck of the ball element and less than the diameter of the head of the ball element.

3. A cable assembly for connecting a fixed article with respect to a movable article, the assembly comprising a cable having a flexible metallic core and a thin plastic sheath encasing and engaging the core along the full length of the core, a pair of ball elements fixed to the opposite ends of said cable, each ball element comprising a spherical head and a tubular neck receiving and gripping the end of the cable including said sheathing, a swivel having a circular opening receiving one of the ball elements with the head portion engageable with wall portions of the swivel defining the opening to thereby prevent withdrawal of the cable from the swivel, the opening in the swivel being sufficiently larger than the associated end of the cable including the diameter of said neck to thereby permit relative universal movement between the cable and the swivel, a generally S-shaped hook loosely secured to said swivel, and adapted to be connected to a movable article, a plate-like member adapted to be mounted upon a fixed article, said plate-like member including an upset hemispherical projection and an elongate slot extending diametrically across said projection, said slot receiving the other ball element with the head of the other ball element engageable with the under surface of said hemispherical projection, said slot having a uniform width of greater diameter than the neck of the associated ball element and less than the diameter of the head of the associated ball element to thereby prevent withdrawal of the cable from said plate-like member regardless of the position of the ball element in the slot.

4. A flexible cable assembly for connecting an article such as a telephone directory, with respect to a fixed member such as a wall of a telephone booth, said assembly comprising a cable having a flexible core, a sheath of flexible coating material encasing and engaging said core along the full length of the core, first securing means adapted to be secured to said fixed member and having an opening therein loosely receiving one end of said coated core to permit relative movement between said cable and said first securing means, second securing means including a swivel and an S-shaped hook having one end connected to the swivel and an opposite end adapted to be secured to said article, said swivel having a circular opening therein loosely receiving the opposite end of said coated core, and ball elements fixedly mounted respectively upon the ends of said coated core and being engageable with portions of said first securing means and said swivel defining said openings for preventing withdrawal of the ends of said coated core from said first securing means and said swivel respectively, said circular opening being sufficiently larger than the end portion of the cable received therein so as to permit relative universal movement between the cable and said swivel.

References Cited by the Examiner

UNITED STATES PATENTS

| | | | |
|---|---|---|---|
| 2,226,502 | 12/40 | Platt | 24—116 |
| 2,227,645 | 1/41 | Hayden | 287—75 |
| 2,302,198 | 11/42 | Ehmann | 24—123 X |
| 2,855,215 | 10/58 | Sheren. | |
| 2,966,541 | 12/60 | Gale | 287—75 X |
| 2,971,723 | 2/62 | Munson | 24—123 X |

FOREIGN PATENTS

| | | |
|---|---|---|
| 725,318 | 2/32 | France. |
| 627,834 | 8/49 | Great Britain. |

DONLEY J. STOCKING, *Primary Examiner.*